(12) United States Patent
Carr (10) Patent No.: US 9,275,472 B2
(45) Date of Patent: Mar. 1, 2016

(54) REAL-TIME PLAYER DETECTION FROM A SINGLE CALIBRATED CAMERA

(75) Inventor: G. Peter K. Carr, Pittsburgh, PA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 556 days.

(21) Appl. No.: 13/595,374

(22) Filed: Aug. 27, 2012

(65) Prior Publication Data

US 2013/0128034 A1 May 23, 2013

Related U.S. Application Data

(60) Provisional application No. 61/561,640, filed on Nov. 18, 2011.

(51) Int. Cl.
*G06K 9/00* (2006.01)
*G06T 7/20* (2006.01)
*G06K 9/32* (2006.01)
*G06K 9/62* (2006.01)

(52) U.S. Cl.
CPC .......... *G06T 7/2053* (2013.01); *G06K 9/00771* (2013.01); *G06K 9/3241* (2013.01); *G06K 9/6206* (2013.01); *G06T 2207/30196* (2013.01); *G06T 2207/30221* (2013.01); *G06T 2207/30236* (2013.01)

(58) Field of Classification Search
USPC ......... 382/103, 169–172, 181, 190, 195, 199, 382/203, 217, 260–265; 348/169–172
See application file for complete search history.

(56) References Cited

U.S. PATENT DOCUMENTS

| 7,003,136 | B1 * | 2/2006 | Harville | 382/103 |
| 7,227,893 | B1 * | 6/2007 | Srinivasa et al. | 375/240.08 |
| 7,231,087 | B2 * | 6/2007 | Huber | 382/222 |
| 7,940,957 | B2 * | 5/2011 | Ikenoue et al. | 382/103 |
| 8,243,991 | B2 * | 8/2012 | Das et al. | 382/103 |
| 8,300,935 | B2 * | 10/2012 | Distante et al. | 382/173 |
| 8,543,525 | B2 * | 9/2013 | Distante et al. | 706/20 |
| 8,948,450 | B2 * | 2/2015 | Hampel et al. | 382/103 |
| 2010/0128927 | A1 * | 5/2010 | Ikenoue | 382/103 |
| 2010/0296697 | A1 * | 11/2010 | Ikenoue | 382/103 |
| 2012/0148103 | A1 * | 6/2012 | Hampel et al. | 382/103 |

OTHER PUBLICATIONS

Benfold et al. "Stable Multi-Target Tracking in Real-Time Surveillance Video"International Conference on Computer Vision, 2011, 8 pages.
Dalal et al. "Histograms of Oriented Gradients for Human Detection", 2005, 8 pages, Computer Vision and Pattern Recognition.
Delanny et al. "Detection and Recognition of Sports (wo)men from Multiple Views", ACM/IEEE International Conference on Distributed Smart Cameras, 2009, 7 pages.

(Continued)

*Primary Examiner* — Anand Bhatnagar
(74) *Attorney, Agent, or Firm* — Fay Kaplun & Marcin, LLP (57) ABSTRACT

A method for detecting the location of objects from a calibrated camera involves receiving an image capturing an object on a surface from a first vantage point; generating an occupancy map corresponding to the surface; filtering the occupancy map using a spatially varying kernel specific to the object shape and the first vantage point, resulting in a filtered occupancy map; and estimating the ground location of the object based on the filtered occupancy map.

21 Claims, 7 Drawing Sheets

(56) References Cited

OTHER PUBLICATIONS

Fleuret et al., "*Multi-Camera People Tracking with a Probalistic Occupancy Map*", IEEE Transactions on Pattern Analysis and Machine Intelligence, 30(2): 267-282, Feb. 2008, 35 pages.

Khan et al., "*A Multiview Approach to Tracking People in Crowded Scenes using a Planar Homography Constraint*", European Conference on Computer Vision, 2006, 14 pages.

Khan et al., "*Tracking Multiple Occluding People by Localizing on Multiple Scene Planes*", IEEE Transactions on Pattern Analysis and Machine Intelligence, 31(3): 505-519, Mar. 2009, 15 pages.

Yildiz et al., "*A Fast Method for Tracking People with Multiple Cameras*", ECCV Workshop on Human Motion Understanding, Modeling, Capture and Animation, Sep. 2010, 11 pages.

\* cited by examiner

REAL-TIME PLAYER DETECTION FROM A SINGLE CALIBRATED CAMERA

CROSS REFERENCE TO RELATED APPLICATIONS

This application is related to, and claims priority from, U.S. Provisional Patent application No. 61/561,640 filed on Nov. 18, 2011 by G. Peter K. Carr entitled "Real-Time Player Detection from a Single Calibrated Camera", the contents of which are hereby incorporated by reference.

FIELD OF THE INVENTION

The exemplary embodiments relate to systems and methods that automatically estimate the positions of objects on a surface in a video, for example, the positions of players on a playing surface in a camera feed. ECCV-2012 conference paper, titled "Monocular Object Detection Using 3D Geometric Primitives", by Peter K. Carr et al., is hereby incorporated by reference.

BACKGROUND INFORMATION

A prior automatic method of detection of persons in a video involves the use of 'histograms of oriented gradients' ("HOG") as an effective means for detecting pedestrians within arbitrary still images. Although the method is quite effective at finding people, the approach is very computationally intensive and therefore slow. Moreover, the HOG pedestrian detector must be trained on a large set of manually labeled data. Publicly available implementations trained on images of pedestrians may not be able to handle the more complex poses of sports players and vantage points which were not included in the training database. Additionally, the HOG descriptor only uses the information from a single frame of video. If a continuous action sport is observed from a stationary camera, temporal information is also available.

Background subtraction is a second automatic method for detecting moving objects. In a background subtraction process each pixel in the video frame is compared to its corresponding pixel in the previous frame or to its corresponding pixel in a reference image that models the background scene possibly based on temporal history. Typically, the output of a background subtraction process is a binary background mask indicating if the corresponding pixel in the video frame is a foreground ("1") or a background ("0") pixel. Alternatively, a background mask may indicate the probability of a pixel being a foreground pixel and hence assumes continuous values. Various background subtraction embodiments are described in U.S. patent application Ser. No. 12/403,857, incorporated by reference herein in its entirety. Note that other methods in the art may be used for foreground detection. For example, a background mask may be generated from depth information (either from a single structured light camera or via the disparity map from a stereo video pair). Similarly to estimating background appearance from the temporal history, modeling the geometry of the scene through temporal history of the depth information (or from a combination of camera's parameters and scene geometry model) is known in the art. Other modalities such as thermal cameras may be used as well for foreground detection.

Background subtraction is very efficient as an initial foreground detection step. Although background subtraction is fast, straightforward implementation of it is also fairly naive and may produce incorrect results. Camera shake, for instance, causes many false foreground detections. This is especially true in high-definition video of outdoor sports, since there is strong contrast between grass and pitch markings. Camera shake, though, may be handled by compensating for vibration when comparing two consecutive frames or when comparing the current frame to a reference (background) image. However, this requires an additional step of image registration that is computationally involved. Another complexity is small appearance changes, caused by rain, snow, and shadows cast by players, for example. Shadows may be detected as foreground objects and are difficult to model. Another challenge is to discriminate between foreground and background regions with similar appearance: players' green uniforms may be mistaken for grass, and their torsos will not be detected as foreground, for example. A robust interpretation of background subtraction results is therefore important for reliable foreground detection.

Typically, a sensitivity threshold is used to determine whether a particular pixel is a foreground pixel. Hence, a pixel may be determined to be a foreground pixel based on its lack of similarity to the average of recent previous values or based on its lack of similarity to the corresponding pixel in a reference (background) image. Individual foreground pixels are then clustered into 'blobs' by finding the connected components in the binary image (background mask). Since the background mask may be noisy, a single connected component may be not corresponding to a complete object. Instead, a second clustering of 'blobs' into 'objects' is often performed. In this step, it is quite difficult to determine automatically (1) how many 'objects' exists, (2) which 'blobs' associate to which 'objects', and (3) the identification of 'blobs' which do not correspond to any 'objects' (in these cases where the 'blobs' were incorrectly identified as foreground regions during background subtraction).

The association of 'blobs' to 'objects' is often ambiguous. Therefore, this particular technique of extracting objects from blobs may be unreliable. For instance, the outstretched leg of one player could be considered as the arm of another player. Complex association heuristics may work in some situations, but they tend to fail catastrophically in other circumstances. To improve the robustness of the 'blobs' to 'objects' association, small 'blobs' are often removed in a preprocessing stage of image erosion followed by image dilation. However, this method could easily discard minute correct detections, such as a player on the far side of the field. Additionally, if many small 'blobs' are present in the image, the connected components algorithm (which groups pixels into 'blobs') may take an excessively long time to process. For instance, when it is raining, the image will be littered with many small false detections or blobs may contain more than one player.

Once an object's foreground was detected in the image space, its position at the scene is computed. The 3D ground position X of a player, for instance, is estimated by finding the 2D location x of their feet in the image and mapping these locations to the ground plane using a homography H obtained from a full or partial camera calibration: x=HX. Knowledge of the homography, H, allows for one-to-one association of a 3D point at the scene, X, with its corresponding 2D point at image space, x. In order to uniquely associate a point at image space, x, with its corresponding point at the scene, X, the homography is expressed with respect to a specific plane in the 3D world. Specifically, the 3D location of a pixel at the player's head-top can be found based on the homography and knowledge of the player's height (i.e. the 2D plane crossing X=(x,y,h)). Similarly, the 3D location of a pixel at the player's foot can be found based on the homography and knowledge of player's feet level (i.e. the 2D plane crossing X=(x,y,0)). Hence, in order to map a pixel in image space to its corresponding 3D point at the scene, knowledge of this point height, for example, is necessary.

A method to interpret background subtraction results on the ground plane (instead of the image plane) involves the realization that homography which maps the object's foreground to the 3D scene, assuming all pixels at ground level, is only valid for those pixels which are a projection of part of the object that actually exists on the ground (such as feet and shadows). This mapping of objects' foreground from the image space to a plane in the 3D scene resulting in a ground map named "occupancy map" that may be an aggregation of mapping results from several cameras positioned at different vantage points. Therefore, a player's feet will consistently map to the same ground position from multiple vantage points, but the upper body will map to different areas. As a result, determining the number of players and their positions in the world is equivalent to finding local peaks in the occupancy map produced by aggregating the mapping of foreground regions detected from multiple vantage points onto the ground plane. In addition to avoiding the heuristics of clustering 'blobs', this method also avoids the threshold stage of background subtraction, as no further analysis involves binary image processing. More details about muliview occupancy map can be found in Khan S. M. and Shah, M., "Tracking multiple occluding people by localizing on multiple scene planes", *Pattern Analysis and Machine Intelligence, IEEE Transactions on*, vol. 31, no. 3, pp. 505-519, March 2009.

The insight that a player's feet will map to the same ground location in all camera views does not apply for just the z=0 plane. If the camera is fully calibrated, it is possible to map the image onto any plane. Following a similar logic, the top of a player's head should consistently map to the same (x, y) location on the z=h plane (assuming the player is h meters tall and standing upright). In fact, some part of the player's body will map to the same (x, y) location for any plane 0≤z≤h parallel to the ground. A height-specific occupancy map generated from multiple parallel planes produces local peaks which are much more dominant than the local peaks of an occupancy map produced from just the ground plane. Such occupancy maps have been generated using multiple cameras from different vantage points. In addition to a player's feet, the ground plane will also have consistent mappings between shadows. However, on horizontal planes above the ground, the shadows will not map to consistent locations. As a result, estimating the (x, y) location of the player by fitting a vertical axis through multiple planes of data is much more reliable than simply searching for the midpoint of the feet on the ground plane.

Mapping to multiple planes is more computationally expensive. In the continuous case, the integration over an infinite number of planes can be projected back into the image. Essentially, this corresponds to pre-computing bounding convex hulls in the image plane for every (x, y) location on the ground. Summing the number of foreground pixels within each convex hull is also an expensive computation. However, if the image is warped such that convex hulls become rectangles, the computation can be optimized using integral images. Although, one can approximate the convex hulls as rectangles, a warp which sends the vertical vanishing point to infinity accomplishes the necessary rectification of the convex hulls, and is equivalent to tilting the camera so that it is level. However, if the camera is horizontal, the precision at which the (x, y) location can be estimated is greatly reduced. For high vantage points the image may be warped such that the optical axis of the camera is perpendicular to the ground. In this perspective, the ability to localize objects on the ground plane is optimal, but the ability to identify objects of height h is minimal. As a result, the integral image optimization requires many views to get accurate positions of objects which are h meters tall. For large outdoor playing areas, many cameras will be needed, and a significantly high vantage point for an approximate overhead view may not be possible. Additionally, since simultaneous access to the raw pixel data from every camera is needed to localize players, there is a high bandwidth requirement for real-time analysis, as all data must be analyzed at a single location.

The above approaches have exhibited numerous disadvantages. Those relying on a single-camera approach have been either slow (HOG) or unreliable ("blob" clustering). Other approaches have relied on the fusing of all the video data from multiple cameras simultaneously, in order to provide a central processing location with simultaneous access to all pixels from all cameras. Performing player detection on this basis requires significant bandwidth; in fact, the bandwidth of gigabit Ethernet limits these approaches to only two or three high definition (HD) cameras. A disadvantage with this fusion approach is that it does not scale well to a large number of cameras, since all the pixel data must be transmitted to a central location for processing. It would be advantageous, in order to ensure greater player detection accuracy and avoid false detections, if a non-fusion method for detecting players in real-time with minimal latency (for example, latency of one frame) could be scaled to a significantly larger number of cameras.

DETAILED DESCRIPTION

The approach of at least one embodiment of the present invention may be described as an analysis of occupancy maps derived from calibrated monocular video. According to an embodiment, objects of a known size and shape are detected in real-time from a single vantage point. In contrast to the method discussed in the Background requiring the fusing of all video data from multiple cameras, the approach of an embodiment of the present invention involves the creation of a height-specific occupancy map from a single camera, and involves the individual processing of each camera captured image and possibly the sending of only the detection results to a central location. The height-specific occupancy map estimates the probability of a location (x, y) on the ground plane being occupied by an object of a certain shape (based on a measure of foreground likelihood, provided by the background subtraction results, for instance).

The exemplary embodiments may be further understood with reference to the following description of the exemplary embodiments and the related appended drawings, wherein like elements are provided with the same reference numerals. The exemplary embodiments are related to systems and methods for detecting objects in a video image sequence. The exemplary embodiments are described in relation to the detection of players in a sporting event performing on a playing surface, but the present invention encompasses as well the tracking of pedestrians in crowd flow applications, such as would be used in parks and resorts, or the detecting of other objects such as vehicles. The method of the exemplary embodiments may be advantageously implemented using one or more computer programs executing on a computer system having a processor or central processing unit, such as, for example, a computer using an Intel-based CPU, such as a Pentium or Centrino, running an operating system such as the WINDOWS or LINUX operating systems, having a memory, such as, for example, a hard drive, RAM, ROM, a compact disc, magneto-optical storage device, and/or fixed or removable media, and having a one or more user interface devices, such as, for example, computer terminals, personal computers, laptop computers, and/or handheld devices, with an input means, such as, for example, a keyboard, mouse, pointing device, and/or microphone. The computer system may include Graphics Processing Units (GPUs), be implemented using a Field-Programmable Gate Array (FPGA), or be part of an embedded system specifically designed for embodiments of this invention to meet real-time constraints.

The exemplary systems and methods may be applied to any type of object detection system that involves the detection of objects in the video image sequence. It is also noted that in the above description and the following description, the exemplary event sites are described as sporting events sites. However, the exemplary embodiments are not limited to such remote event sites. The detection method of the present embodiments may be described as having two stages. First, a height-specific occupancy map is generated (preferably at each frame) and, second, a spatially varying filter is applied to identify objects of a specific width and depth (involving the extraction of local peaks to determine XY locations on the ground). One example of a spatially varying filter function that can be used in the exemplary embodiments is a spatially varying kernel, which may be embodied as a 2 dimensional matrix, but in general can be embodied as a 1 or three dimensional matrix as well. With regard to the objects to be identified, for example, in the case of detecting players, one embodiment of the method approximates them as cylinders 1.8 m tall and 0.5 m wide.

Figure 1A:
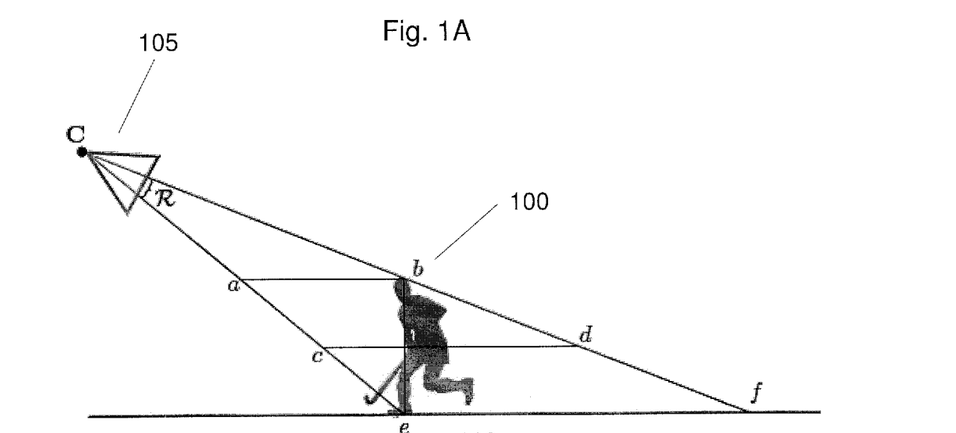
FIG. 1A shows an exemplary embodiment in which a field hockey player 100 is illustrated being recorded by camera 105.
Figure 1B:
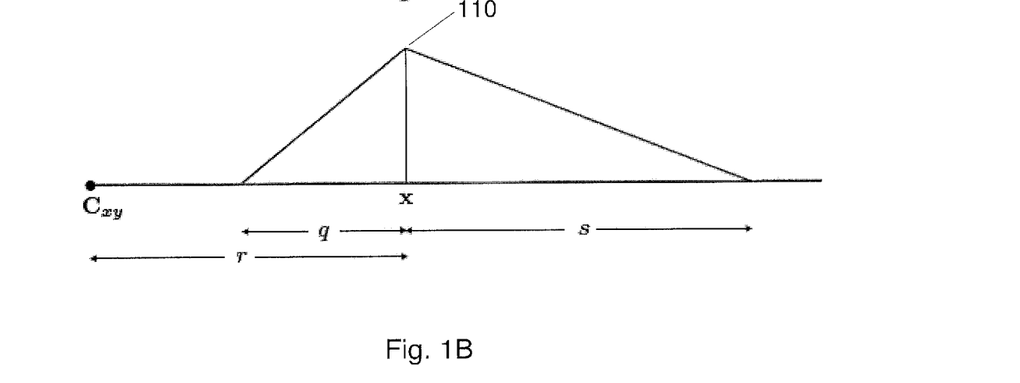
FIG. 1B shows a triangle response based on FIG. 1A.
Figure 2:
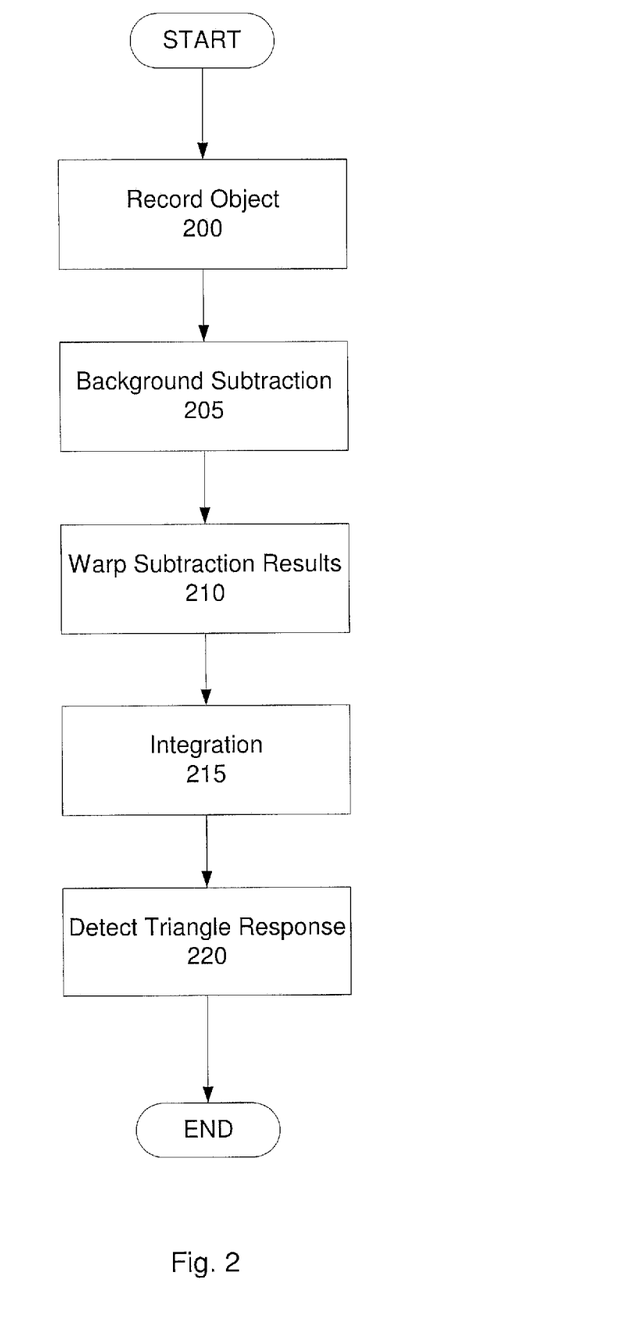
FIG. 2 is a flow diagram illustrating an operation of an exemplary embodiment of the present application.

FIGS. 1A and 1B, in conjunction with the flow diagram of FIG. 2, are diagrams illustrating the principles of player detection using a single calibrated camera, according to an embodiment of the present invention. In FIG. 1A, a field hockey player 100 is illustrated being recorded by camera 105. (Step 200 in FIG. 2). The camera may be oriented, for example, to look down at an angle of 45°. The process employs a background subtraction method resulting in a foreground mask covering the foreground region R of the image plane. (Step 205). Although an embodiment of the present invention can use a binary foreground mask, the present invention may also use continuous measures, meaning pixels in the foreground mask assume bounded values (e.g. between 0 to 1) representing the probability of being part of a foreground region. Next, pixels from the foreground mask warped onto multiple horizontal planes (e.g. the parallel to the ground planes ab and cd) based on the given homography. (Step 210). Working in the geometry of the image plane is not ideal because the near side of the field is oversampled, and the far side is undersampled. Therefore, instead of warping the foreground region from the image space onto horizontal planes at the scene's 3D space a backward mapping may be preferred. Hence, an embodiment of the present invention involves setting a grid of equally spaced points on the scene's ground (such as every 10 cm, for example) and projecting these points back into the image. The process then calculates the probability of whether the feet of a player exist at this ground plane location based on the value of the background mask at the projected point location.

Back to FIG. 1A, for convenience of explanation, a region R of the image plane is considered, which has been detected as foreground, and this region corresponds to a complete individual. On each horizontal plane between $z=0$ and $z=h$ some portion of R will map to the true position of the player (illustrated by line segment be in FIG. 1A). The player's feet will map to the correct (x, y) position on the ground plane ($z=0$ plane), but his/her head will map to a very different location on the ground plane. Similarly, a player's head will map to the correct (x, y) location on the $z=h$ plane, but his/her feet will appear at a location much closer to the camera on that plane. Generally, some part of the player's body will always map to the correct (x, y) location on a particular horizontal plane between $z=0$ and $z=h$ (the rest of the body will map in front of and behind the true location). The volume of interest in the 3D world is divided into small volume elements. An occupancy value for the volume element at $X=(x,y,z)$ is determined by projecting the 3D position X into the camera's image and interpolating the image of foreground likeliness at location x. Finally, by summing the occupancy scores of the vertical column of volume elements located at (x,y) (step 215), a height-specific occupancy map is generated. The map is then searched for a triangle response 110 (FIG. 1B) to be detected (step 220) along the camera/player cross-section, with the apex of the triangle corresponding to the true (x, y) location of the player, assuming the player is isolated in region R. The extent of the response (indicated by q and s in FIG. 1B) is determined by the distance r from the camera along the ground and the height Cz of the camera. If players are suitably close together along the line of sight of the camera (such as a distant player's feet being near the head of a player close to the camera), the triangle responses may overlap. In such a situation, the process may resolve this overlap by turning to a different camera that is recording the event from a viewpoint where the overlap is not present.

A graphics processing unit (GPU) residing in the camera can compute the height specific spatial occupancy map for a resolution of 10 pixels/m, for example (other resolutions may be used). Every output pixel in the occupancy map is computed directly from the input background mask using the camera's projection matrix (homography). The GPU implementation of the method described in FIG. 2 is carried out as follows. To calculate the occupancy map value at a pixel corresponding to a certain ground location (x,y,0), a vertical segment starts at (x,y,0) and ranges to the exemplary position (x,y,h=1.8 m) is sampled at 5 samples/m (other ranges and sampling resolution may be used, depending on the object to be detected). Next, each vertical sample, $X_i$, is mapped to the corresponding location in image space using the camera's projection matrix P: $x_i=PX_i$. Then the background mask is interpolated at these projected locations $x_i$ resulting in a corresponding mask value for each sample. Finally, the average of all samples' mask values is computed. As a result, if the entire 1.8 m tall player is mapped onto the player's corresponding foreground region on the image plane, the (x,y) location in the spatial occupancy map will have a value of 1. Similarly, if all samples are mapped onto a background region, the spatial occupancy value will be 0.

The number of players and their locations can be determined by searching the height-specific spatial occupancy map for expected cross-sectional patterns, such as triangles for the case of tall, thin cylinders (players). The exact nature of an expected pattern depends on the size and shape of the object, its 2D location on the ground plane, and the 3D position of the camera. In other words, the expected pattern is "spatially varying" because each discrete location in the 2D height-specific occupancy map will have a unique template defined by a specific set of cross-sectional patterns which indicate the presence of an object of particular size and shape at this specific (x,y) location. The "spatially varying" nature of the template makes efficient searching difficult. For a particular location X in the height-specific occupancy map generated for players, the triangular cross-sectional pattern will be oriented along the line connecting X and Cxy (the projection of the camera center onto the ground plane). The extent of the triangle in front of and behind X (with respect to the ground location Cxy of the camera) is, respectively, $q=hr/Cz$ and $s=hr/(Cz-h)$. Where r is the distance between X and Cxy.

Figure 9:
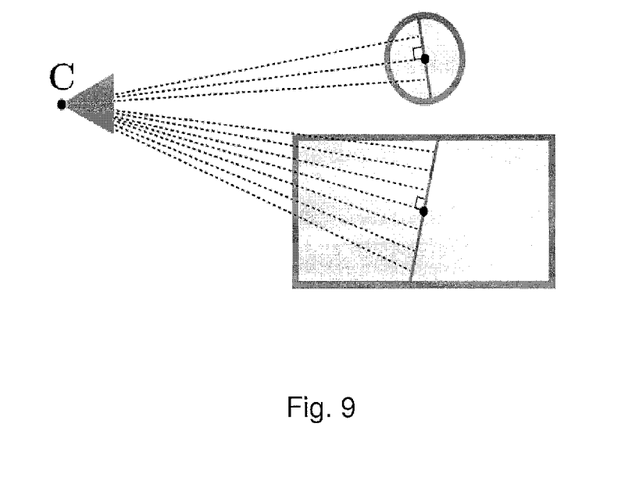
FIG. 9 is an illustration of how objects of non-zero width will have multiple cross sections from the camera's vantage point.
Figure 10:
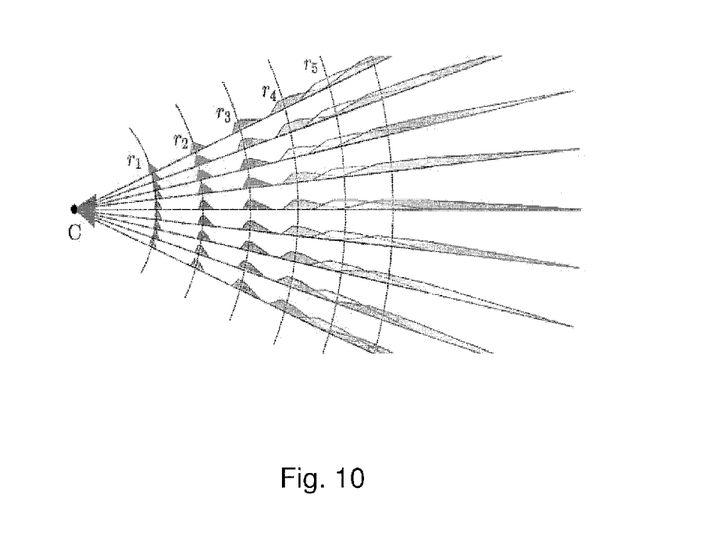
FIG. 10 shows an expected trapezoidal pattern along a cross-section at a particular location.

FIG. 9 shows how objects of non-zero width will have multiple cross sections from the camera's vantage point. The expected trapezoidal pattern along a cross-section at a particular location is shown in the FIG. 10. Therefore, the template of an object is the set of cross-sectional patterns along a number of cross-sections spanning the extent of the object.

In addition to a spatially varying template the height-specific spatial occupancy map contains errors propagated from background subtraction. Therefore, achieving well localized strong template matches will be difficult. Furthermore, not all players will be exactly 1.8 m tall. Shorter players will generate smaller template matching filter responses; taller players will produce larger, saturated responses. As a result, template matching is treated as a filtering process, which allows for the search of significant local peaks in the filtered response. The template matching performed by the exemplary embodiments searches for isolated individuals; if multiple vantage points from multiple deployed cameras are used in a crowded scene, the detection according to the exemplary embodiments assumes each individual will appear in isolation in at least one view.

According to this approach of the exemplary embodiments, in a situation where a plurality of cameras located at different vantage points are each performing the detection method taught herein in parallel and independent of each other, the pixel data from each camera may be processed in parallel, so that only low-bandwidth detection results are fused at a central location. On account of the lower bandwidth requirements, the exemplary embodiments permit a larger number of cameras to be used than the prior art approach. These cameras detect individuals by transmitting the location data found independently by each camera to a centralized location for fusion and subsequent processing.

Figure 3:
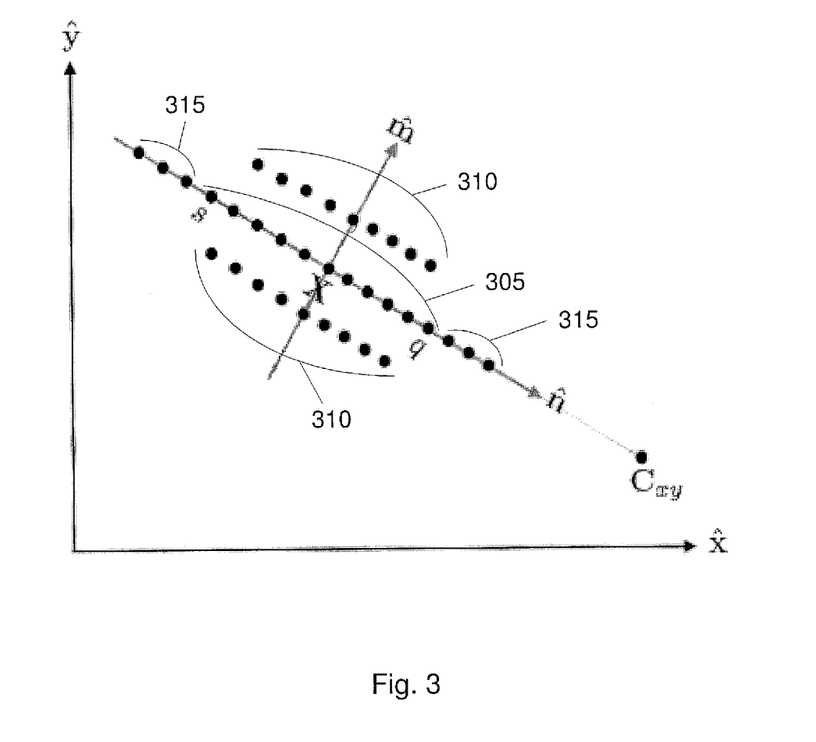
FIG. 3 illustrates a template as defined by a fixed number of spatial samples.
Figure 4:
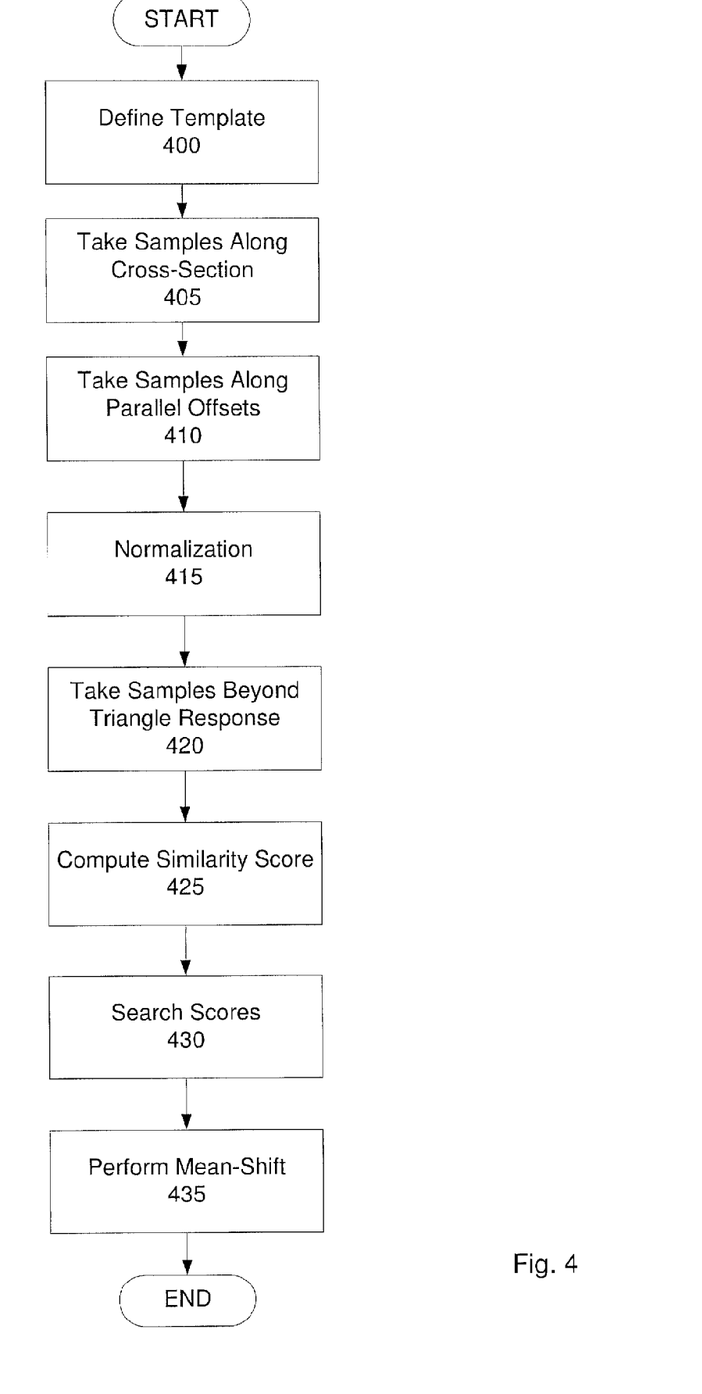
FIG. 4 illustrates a flow diagram for generating the template of FIG. 3.
Figure 5:
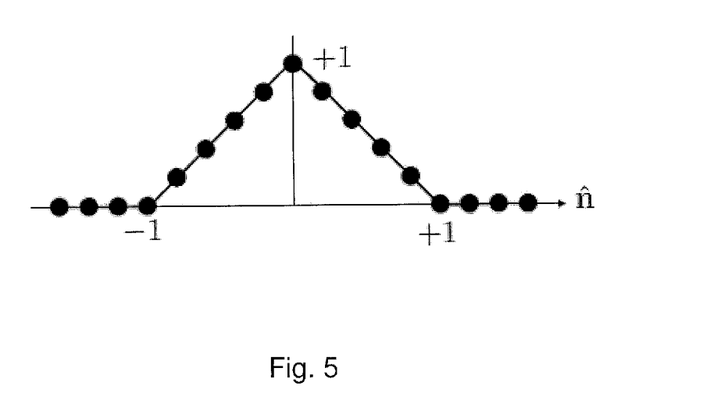
FIG. 5 illustrates a set of normalized sampling locations.

The GPU that may be associated with the camera recording the video image containing region R computes a template matching score for each location in the height-specific spatial occupancy map by comparing the actual response to its theoretical triangle response. Template similarity can be evaluated at each pixel by sampling values from the surrounding local area. For efficiency, as seen in FIG. 3 and represented in the flow diagram of FIG. 4, the template is defined as a fixed number of spatial samples. (Step 400). The local coordinate system is defined by the direction $\hat{n}$ of the cross-section between X and Cxy. The positive and negative half-planes (defined by $\hat{n}$) are scaled so that both sides of the triangle response have positive or negative unit slope. To determine whether location X in the occupancy map coincides with the apex of an isolated triangle response, samples 305 are taken along the cross-section direction $\hat{n}$ (which points from X to Cxy) (step 405) and along parallel offsets 310 to the cross-section (step 410). For convenience, the n component of the sampling locations are scaled/normalized by 1/q or 1/s so that the template has positive and negative unit slopes (step 415) (FIG. 5). The sampling locations in FIG. 5 are normalized so that the sampled values will match a triangle response with a unit slope. Turning back to FIG. 3, samples 315 beyond the range of the triangle response are also taken to ensure the triangle is isolated—i.e. padded by zero occupancy values before and after (step 420). Finally, note that spatial samples 310 offset by $\pm w \hat{m}$ are used to ensure the triangle response is isolated laterally. Both additional samples, 310 and 315, test for zero response and are used to ensure that the triangle response is isolated, by ensuring zero values around the perimeter. The scaling parameter w represents the minimum separation distance between player positions, which may be 0.5 m, for example.

The similarity score between the expected and actual responses is expressed as the sum of squared differences (SSD) for all samples (step 425). Alternatives such as sum of absolute differences (SAD) or normalized cross correlation (NCC) may also be used. The SSD values are scaled relative to the template similarity score of an unoccupied region. A perfect match will have a score of 0, while a match to unoccupied space will have a score of 1. The inverted normalized SSD scores are searched for significant local peaks (those above 0.5) (step 430). Significant local maxima (peaks) in the filtered occupancy map indicate the presence of isolated objects (players). However, because of noise (and possibly the sampling resolution), the peaks will be spread out and corrupted with noise. As a result, a robust peak finding algorithm, for example a mean shift algorithm is used to determine the number of players and their precise (x,y) locations (step 435).

The mean shift algorithm iteratively updates a set of "modes" which correspond to identified significant local peaks. At each iteration of the mean shift algorithm, data points are assigned to the closest mode, and the mode is updated using a weighted average of the assigned data points. The iterations continue until every data point continues to be associated with the same mode (no data point changes its mode association in successive iterations). As the algorithm proceeds, modes which are sufficiently close coalesce into a single mode. In this embodiment, the data points are generated by identifying all (x,y) locations in the filtered occupancy map which are above a particular value. The initial modes are generated by associating a single mode to each data point. At each iteration, each data point is assigned to its nearest mode by calculating the Mahalanobis distance, where the covariance of each data point is determined by the image to ground nomography. In this situation, the mean shift parameters (of closeness for coalescing and covariance for Mahalanobis distance) relate directly to geometry, and a priori values can be used without needing to tune for each specific situation. The single view methodology of the exemplary embodiments avoids introducing parameters requiring tuning for each specific application. According to the exemplary embodiments, the parameters are based on the underlying geometry of the scene. Only the camera calibration parameters and extent of the playing surface need to be estimated or specified during employment. To achieve real time performance, the mean shift algorithm may be terminated after a finite number of iterations, even if some data points continue to alternate between assigned closest modes.

Instead of computing a unique template for each pixel, the spatial occupancy map can be re-sampled using polar coordinates. In this co-ordinate system, the template would no longer have varying orientation. However, size would still change in the vertical and horizontal directions. The polar transform would be particularly suitable for smaller venues. For larger areas, where the necessary angular resolution to maintain the same spatial resolution (e.g., 10 pix/m) on the far side of the playing surface (e.g., approximately 50 m) may require a great deal of memory for polar coordinates. As an alternative to mean shift, a threshold may be applied to the filtered occupancy map to find areas which have significantly high occupancy scores, the resulting binary image should contain many small elliptical areas. Each ellipse represents the presence of an isolated object, and the center of the ellipse is a good estimate of the object's precise (x,y) location. Finally, different distributions of spatial samples could be used when evaluating how likely a pixel in the spatial occupancy map coincides with the apex of a triangle response.

Figure 6:
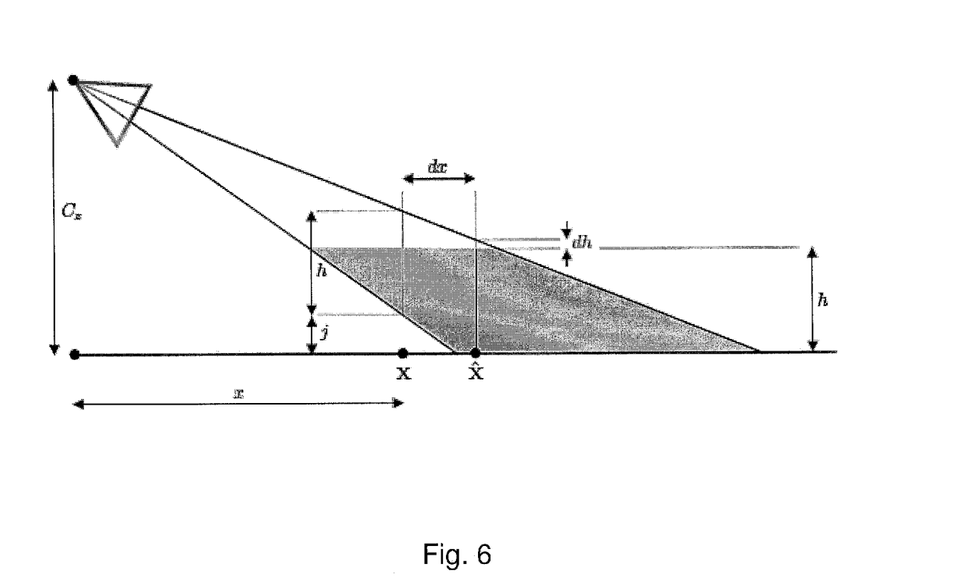
FIG. 6 is a diagram illustrating the situation in which a player jumps a height j.

FIG. 6 is a diagram illustrating the situation in which a player jumps a height j. As shown in FIG. 6, a player of height h standing at ground location x jumps j meters above the ground. The back-projection of the player's head and feet delineate the integration bounds between z=0 and z=h. In this situation, the cumulative response resembles a trapezoid, not a triangle. As a result, the algorithm will estimate the player's position $\hat{x}$ as the mid-point of the top edge of the trapezoid. In this situation, the incorrect ground plane assumption creates two sources of error. First, the player's position has a bias of dx further from the camera. Second, the player appears to be dh taller. The magnitudes of dx and dh depend on the height $C_z$ of the camera, the distance x along the ground between the player and the camera, the height j of the jump and the height h of the player.

$$dh = \frac{jh}{2}\left(\frac{1}{C_z - j}\right)$$

$$dx = \frac{jx}{2}\left(\frac{1}{C_z - j - h} + \frac{1}{C_z - j}\right)$$

Generally, a machine vision camera will be located quite high in the air, and a player's jump will be much smaller than his/her height, which implies $$j \ll h \ll C_z.$$

As a result, approximate expressions for dh and dx are $$dh \approx \frac{jh}{2C_z}$$

$$dx \approx \frac{jx}{C_z}.$$

One way to minimize the position error dx is to place the cameras as high as possible. Mathematically, as $C_z \to \infty$ the position error $dx \to 0$. For example, if the camera was placed on the ceiling looking directly downwards, the camera would not observe the vertical displacement of a player as he/she jumps. Another situation is when the camera is not high enough to neglect other effects. As long as the player is at a location x>(½)h (which should be typical in most set-ups), the change in position dx may be larger than the change in height dh. As a result, the occurrence of a jumping player will be easier to detect by testing for a non-zero dx value (the magnitude of dh will be insufficient to identify players that appear too tall). From a single image, there may be no definitive way to test whether the detected position $\hat{x}=x+dx$ has a non-zero $\|dx\|$ bias. If the system is tracking a series of detections $\{\ldots, \ddot{x}_{t-2}, \ddot{x}_{t-1}, \ddot{x}_t\}$, then it may be possible to test for discrepancies in smooth trajectories (especially since the bias will be along the line of sight). However, in practice, that is probably not feasible, as detection noise and tracking errors will probably dominate any $\|dx\|$ offset from jumping. Instead, observations from two different vantage points will show that the detection of a jump becomes much more noticeable. When the player is on the ground, cameras 1 and 2 should observe consistent ground positions—i.e. $\hat{x}1=\hat{x}2=x$. However, when the player jumps into the air, the position errors dx1 and dx2 will be quite different (as long as the vantage points are significantly different). More importantly, the two errors will be correlated, since they both depend directly on the height of the jump j. The distance x along the ground between the player and the camera and height of the camera $C_z$ will be different for both vantage points (but roughly constant over the duration of the jump). As a result, the errors are correlated, but not equal.

As mentioned above, the detection method of the exemplary embodiments is not limited to detecting players of a sport. The player detection embodiment models players as cylinders approximately 1.8 m tall and 0.5 m wide. For detecting other types of objects, such as vehicles, the detection method can be generalized to recognize constant height 3D geometric primitives, such as rectangular blocks and cylinders. Any cross-section through one of these primitives will generate a 2D rectangle (since the object has constant height). More importantly, the back projected camera rays which contain the rectangular cross-section will result in an arbitrary convex quadrilateral when integrated over a particular vertical range z=[0,H]. The previous triangular response corresponds to a particular instance of a convex quadrilateral. A given rectangular cross-section of width w and height h lying on the ground will generate two points p and s where the back projected rays from the camera intersect the ground plane (see FIG. 4). A second plane parallel to the ground but elevated H will intersect the two rays at points q and r. Like the previous section on jumping, similar triangles can be used to derive the relation between p and r $$\frac{r}{C_z - H} = \frac{p + w}{C_z - h}$$

$$\frac{r}{p} = \left(1 + \frac{w}{p}\right)\frac{C_z - H}{C_z - h}.$$

The integrated response will be a:
quadrilateral if r<p,
triangle if r=p,
trapezoid if r>p.

Generally, the integration limit H will be similar to the object height h. Furthermore, both w and p are greater than zero. As a result, the expression for r/p will be greater than 1 the majority of the time (indicating a trapezoid response). When w=0 and H=h, p is equal to r, which means a triangle response is produced. Any slight deviation of the actual object height h relative to the assumed height H will result in a non-triangle response, and the mean-shift algorithm should produce an answer at the center of the cross-sectional rectangle (which is equivalent to the midpoint of the top edge of the trapezoid when h=H).

In the case of vehicle detection, vehicles can be coarsely modeled as 3D blocks having particular width, height and depth. Unlike a cylinder, the width of the cross-sectional rectangle will change with the vehicle's position and orientation relative to the camera. However, since the camera is calibrated and vehicles often align with the direction of the road, one can infer the orientation of the 3D block for a given ground position. As a result, the expected cross-sectional width is known which means the expected trapezoidal response template is also known. The height-specific spatial occupancy map is calculated in the same fashion, although using a different maximum height limit. The template filtering method would be conceptually the same, but the template is no longer a triangle response and the sampling pattern is different (and possibly the cost function—i.e., sum of absolute differences, normalized cross correlation). If the orientation of the vehicle is not known as a function of position, multiple filters may be applied to test for similarity with respect to a selection of specific orientations.

Figure 7:
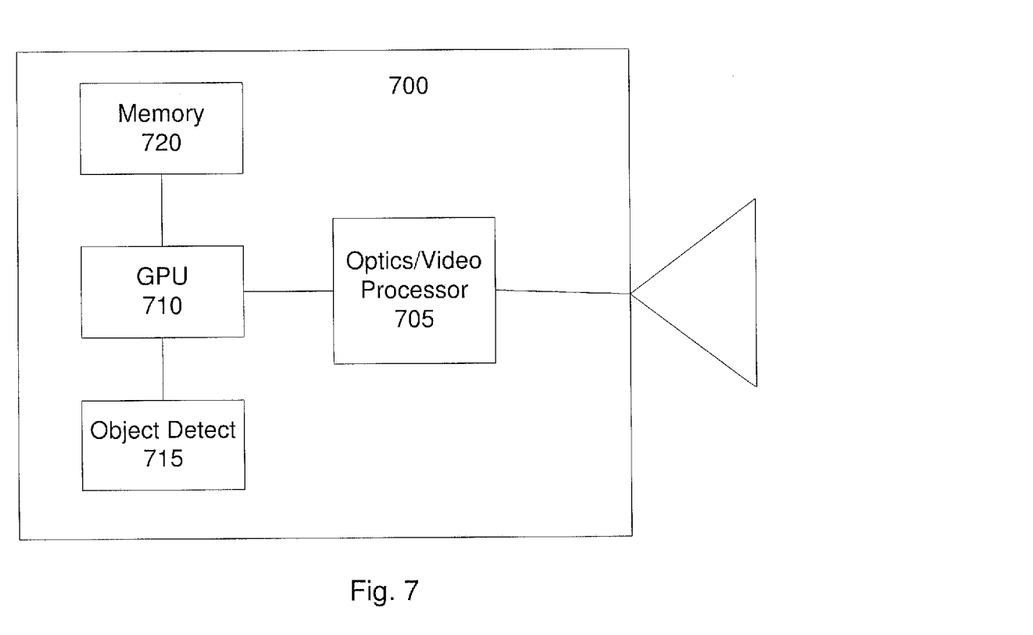
FIG. 7 shows a block diagram of a camera equipped to perform the object detection method described herein.

FIG. 7 shows a block diagram of a camera 700 equipped to perform the above-described object detection method. The camera 700 includes a conventional optics/video processing module 705 for producing a video signal depicting an object, a GPU 710 and object detection module that together perform the above-described object-detection embodiments, and a memory 720 for storing such data structures as the occupancy map and detection results. The camera 700 also is provided with a transmitter for transmitting the low-bandwidth detection results wirelessly or over a wired network to a central location (e.g., a video truck outside of the sports venue or a remote studio) for further processing or storage.

Figure 8:
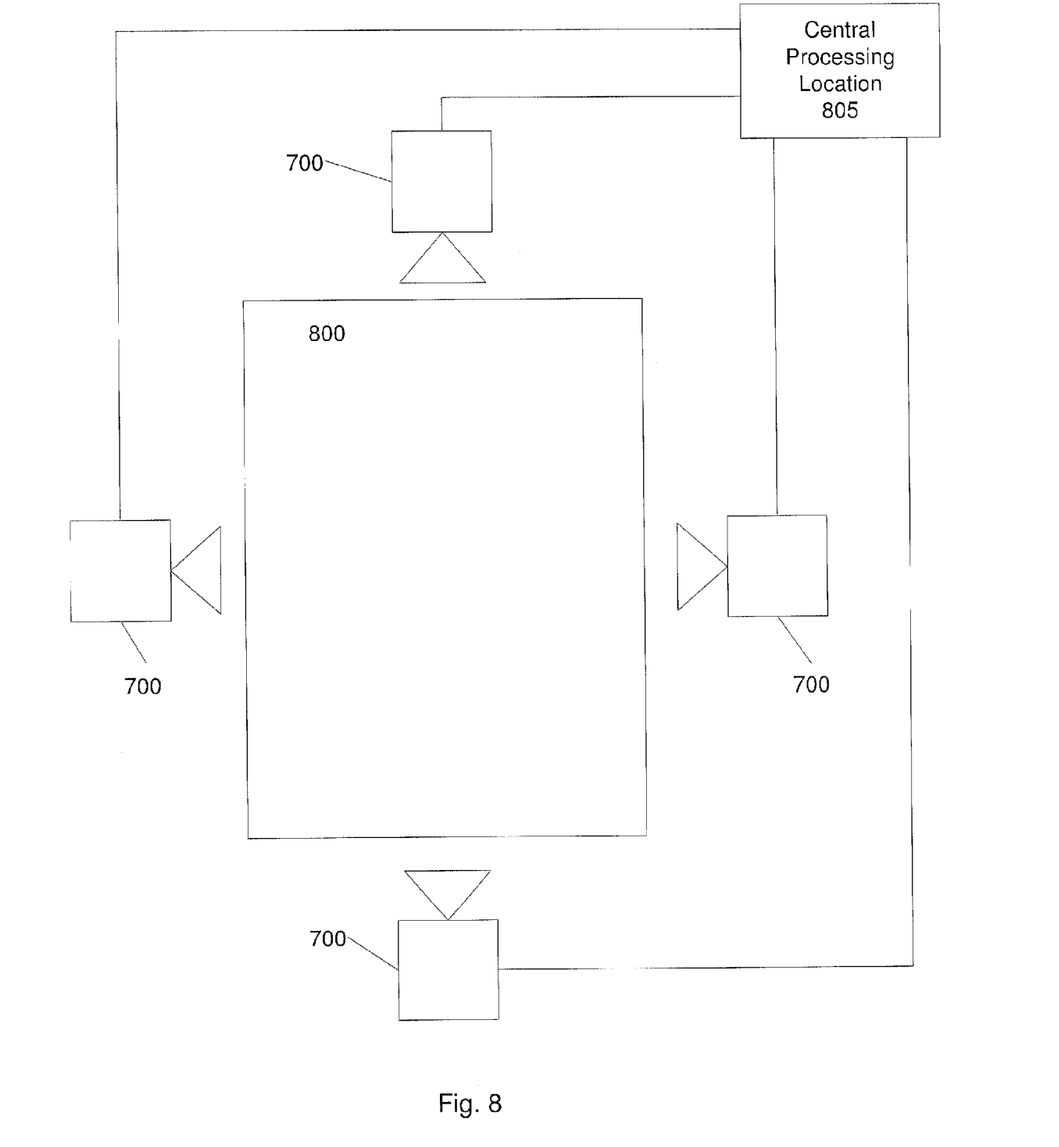
FIG. 8 shows a plurality of cameras deployed around a sports venue, such as a stadium.

FIG. 8 shows a plurality of cameras 700 deployed around a sports venue 800, such as a stadium. As explained above, each camera 700, in performing the embodiments described above, independently detects the players within its own vantage point and transmits its own low-bandwidth detection results to a central facility 805, where the detection results can undergo further processing, such as resolving conflicting or ambiguous player detections, or incorporating the results into a real-time or recorded program for distribution to viewers. Although FIG. 8 shows only four cameras, the present invention, because it eliminates the need for full image search across different scales and produces a low-bandwidth output containing detection results, allows the detection process to be scaled up to a large number of cameras. The practical limit for the feasible number of cameras is a function of the data aggregation speed at a central location.

What is claimed is:

1. A method for detecting a location of an object from a calibrated camera, comprising:
   receiving an image capturing the object on a surface from a first vantage point;
   generating an occupancy map corresponding to the surface;
   filtering the occupancy map using a spatially varying kernel specific to the object shape and the first vantage point, resulting in a filtered occupancy map; and
   estimating the location of the object based on the filtered occupancy map.

2. The method of claim 1, wherein the object is a human, approximated by a cylinder.

3. The method of claim 1, wherein the object is a vehicle modeled by a cuboid.

4. The method of claim 1, wherein the occupancy map is computed based on a plurality of horizontal planes located between a first and a second plane, whereas the first plane corresponding to a height of zero and the second plane corresponding to a height of the object.

5. The method of claim 1, wherein the occupancy map is generated from a background mask extracted from the received image.

6. The method of claim 1, wherein the filtering includes applying a spatially varying filter to the occupancy map to identify each object matching a height criterion and a shape criterion.

7. The method of claim 1, wherein the filtering includes calculating a template matching score for each location in the occupancy map by comparing a theoretical response to an actual response at each location.

8. The method of claim 7, wherein the template matching score is determined by calculating a sum of squared differences.

9. The method of claim 8, wherein the template matching scores for all locations in the occupancy map are searched for peaks meeting a predetermined criterion and corresponding to object locations.

10. The method of claim 1, wherein the geometric response is one of a triangle response and a trapezoid response.

11. A system for detecting a location of an object from a calibrated camera, comprising:
    a memory that stores information related to images of the object detected by the calibrated camera;
    a processor configured to:
       receive an image capturing the object on a surface from a first vantage point;
       generate an occupancy map corresponding to the surface;
       filter the occupancy map using a spatially varying kernel specific to the object shape and the first vantage point, resulting in a filtered occupancy map; and
       estimate the location of the object based on the filtered occupancy map.

12. The system of claim 11, wherein the object is a human, approximated by a cylinder.

13. The system of claim 11, wherein the object is a vehicle modeled by a cuboid.

14. The system of claim 11, wherein the occupancy map is computed based a plurality of horizontal planes located between a first and a second plane, whereas the first plane corresponding to a height of zero and the second plane corresponding to a height of the object.

15. The system of claim 11, wherein the occupancy map is generated from a background mask extracted from the received image.

16. The system of claim 11, wherein the filtering includes applying a spatially varying filter to the occupancy map to identify each object matching a height criterion and a shape criterion.

17. The system of claim 11, wherein the filtering includes calculating a template matching score for each location in the occupancy map by comparing a theoretical response to an actual response at each location.

18. The system of claim 17, wherein the template matching score is determined by calculating a sum of squared differences.

19. The system of claim 18, wherein the template matching scores for all locations in the occupancy map are searched for peaks meeting a predetermined criterion and corresponding to object locations.

20. The system of claim 11, wherein the geometric response is one of a triangle response and a trapezoid response.

21. A non-transitory computer-readable medium containing instructions that when executed on a computing device results in a performance of the following:
- receiving an image capturing an object on a surface from a first vantage point;
- generating an occupancy map corresponding to the surface;
- filtering the occupancy map using a spatially varying kernel specific to the object shape and the first vantage point, resulting in a filtered occupancy map; and
- estimating a location of the object based on the filtered occupancy map.

* * * * *